United States Patent
Krauss

[15] 3,682,276
[45] Aug. 8, 1972

[54] ROPE BRAKE

[72] Inventor: Wallace J. Krauss, 2927 Dahlia Ave., Baldwin, N.Y. 11510

[22] Filed: Sept. 23, 1970

[21] Appl. No.: 74,558

[52] U.S. Cl. .................... 188/65.3, 182/5, 188/65.5
[51] Int. Cl. ........................................ B65h 59/14
[58] Field of Search....188/65, 65.1, 65.3, 65.4, 65.5; 182/5, 7

[56] References Cited

UNITED STATES PATENTS

| | | | |
|---|---|---|---|
| 269,268 | 12/1882 | Davis | 188/65.4 X |
| 643,575 | 2/1900 | Walker et al. | 188/65.5 X |
| 641,809 | 1/1900 | Tillottson | 188/65.5 |
| 3,357,520 | 12/1967 | Foote | 188/65.4 X |

FOREIGN PATENTS OR APPLICATIONS

| | | | |
|---|---|---|---|
| 83,749 | 5/1954 | Norway | 188/65.1 |

*Primary Examiner*—George E. A. Halvosa
*Attorney*—Leonard H. King

[57] ABSTRACT

For use in assisting a mountain climber, a tree climber or the like to descend a rope, there is provided a mechanical coupling comprising back-to-back tubular members through which lengths of the rope extend. One of the tubes includes a stationary rope gripping member while the other tube includes an eccentric member that acts as a brake and which is adapted to engage and selectively impede or completely halt the downward movement of the user. A feature of this invention is that the device may be threaded on to both lengths of the rope at any location. The individual fastens one end of one length of the rope about his body and threads one of the tubes on to one of the lengths of rope such that the rope gripping member rigidly engages the rope. With both hands free, the individual may then lower himself down the other rope which is threaded onto the second tube, using the eccentric member as a brake whenever it is necessary.

1 Claim, 5 Drawing Figures

INVENTOR.
WALLACE J. KRAUSS

ROPE BRAKE

The aforementioned abstract is neither intended to define the invention of the application which, of course, is measured by the claims, nor is it intended to be limiting as to the scope of the invention in any way.

This invention relates generally to rope-gripping devices, particularly for descending a double length of rope.

One object of this invention is to provide a gripping device that will permit descent along a rope with both hands free.

Another object of this invention is to provide a rope-gripping device that may be applied at any place along the length of the rope.

Still another object of this invention is to provide a rope-gripping device that is particularly adaptable for use when descending a double length of rope.

These and other objects, features and advantages of the invention will, in part, be pointed out with particularity, and will, in part, become obvious from the following more detailed description of the invention, taken in conjunction with the accompanying drawing, which forms an integral part thereof.

Figure 1:
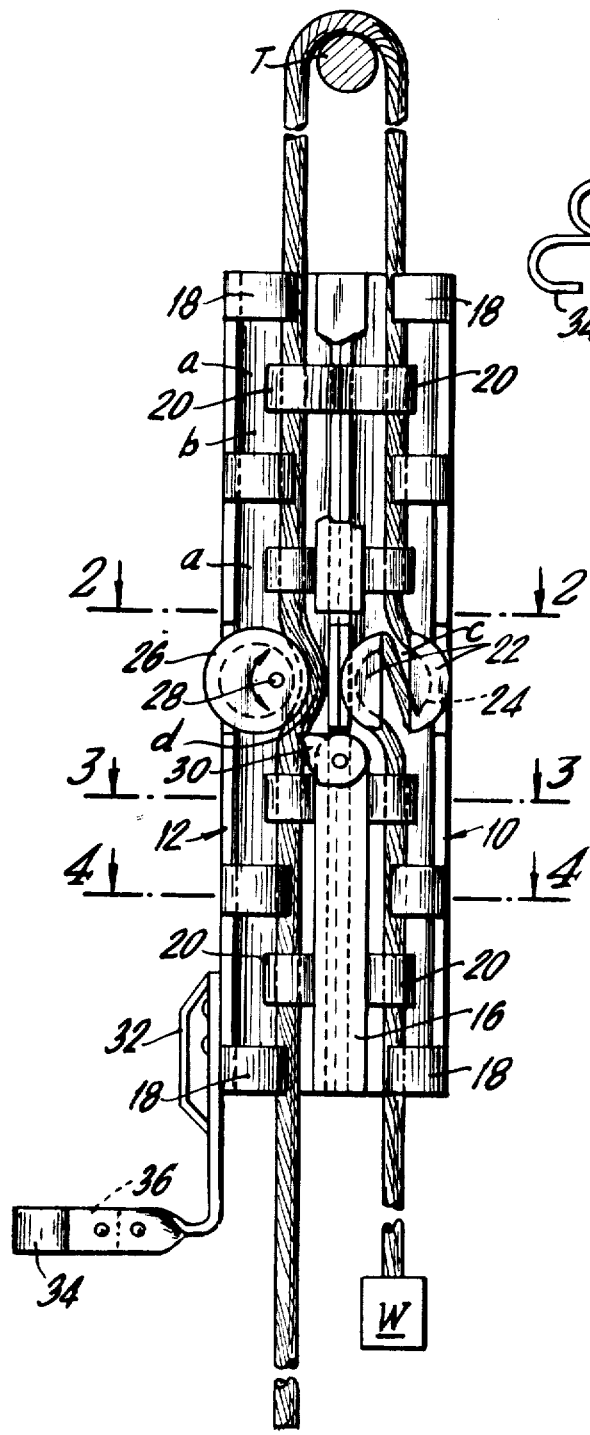
FIG. 1 is an elevational view illustrating one embodiment of the present invention.
Figure 2:
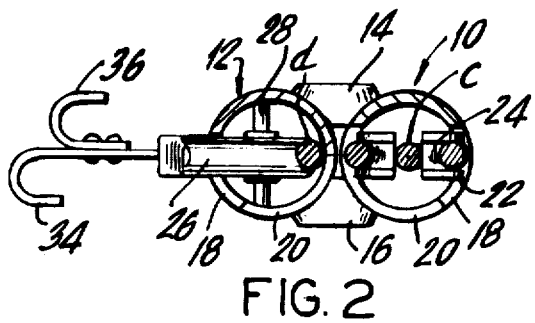
FIG. 2 is a sectional plan view taken along line 2—2 of FIG. 1.

The present invention, as shown in FIG. 1, is comprised of two elongated tubular members 10 and 12 that are secured in side-by-side relationship to each other. Front and rear plates 14 and 16, respectively, may be used for this purpose. The plates 14 and 16 may be secured to the tubes 10 and 12 by any suitable technique such as welding.

Figure 3:
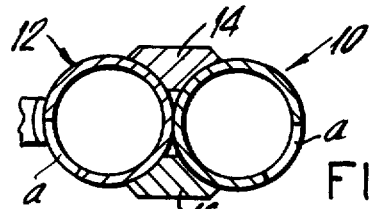
FIG. 3 is a sectional plan view taken along line 3—3 of FIG. 1.
Figure 4:
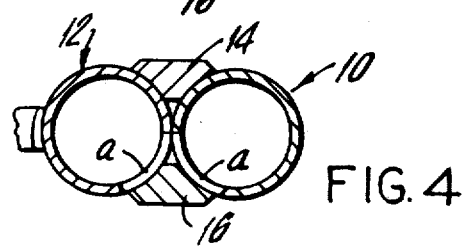
FIG. 4 is a sectional plan view taken along line 4—4 of FIG. 1.

Both of the tubes 10 and 12 are provided with a plurality of axially spaced fingers 18 and 20 that extend in a circumferential direction. For purposes of clarity, and with particular respect to FIGS. 3 and 4, it may be assumed that each of the tubes 10 and 12 covers an arcuate segment of approximately 180°. The fingers 18 and 20 extend from the 180° arcuate segment in opposite directions and cover an additional arc of approximately 120°, for example. The remaining arc that is not covered by the fingers 18 and 20 is a function of the diameter of the rope and is dimensioned such that the space remaining between the end of the fingers and the 180° portion of the tube, is at least as great as the diameter of the rope.

For the purpose of this description, the opening left at the end of each of the fingers 18 and 20 is designated by the reference character $a$. Similarly, the axial spacing between each of the fingers 18 and 20 is at least as great as the diameter of the rope being used. This spacing in FIG. 1 is designated by the reference character $b$. The advantage of this arrangement is that the device may be threaded on to the rope at any location along the length thereof, as will be described hereinafter.

Approximately midway along the length of the tube 10 there is provided a rope-gripping member one embodiment of which comprises two semi-circular discs 22. Each of the discs 22, which may also take other shapes, includes an annular, circumferential groove 24. The two discs 22 are spaced apart by a dimension at least as great as the diameter of the rope as shown by the reference character $c$ in FIG. 1.

The other tube 12 is provided, at approximately its midpoint and opposite the discs 22, with a wheel-like brake 26 that is rotatably journaled on a pin 28. The brake 26 can move in both angular directions. It should be noted that the maximum dimension d between the circumference of the brake 26 and the inside diameter of the tube 12 is only slightly larger than the diameter of the rope. When the brake 26 is rotated in either angular direction, the space d between the circumference of the brake and the inside diameter of tube 12 will be reduced, thus providing a wedging and gripping action against the rope. The purpose of this structure will be described hereinafter.

In one embodiment of this invention, the lower end of the tube 12 is hingedly mounted to the remainder of the structure by means of front and rear plates 30. Further, the lower end of the tube 12 is provided with a handle 32 as well as integral rope-hooking members 34 and 36, the function of which will be described hereinafter.

MODE OF OPERATION

With a 150-foot length rope, a man that is represented schematically by the reference character W in FIG. 1 can use the present invention in order to traverse a 75-foot drop. One end of the rope is lowered down the drop. The other end of the rope is placed around an anchor, such as a tree or a rock (shown schematically in FIG. 1 by the reference character T), and then the other end of the rope is fastened to the climber. The rope is then threaded at any location into the tube 10, traversing the rope-gripping discs 22, as shown in FIG. 1. The other length of the rope is then threaded through the tube 12.

Figure 5:
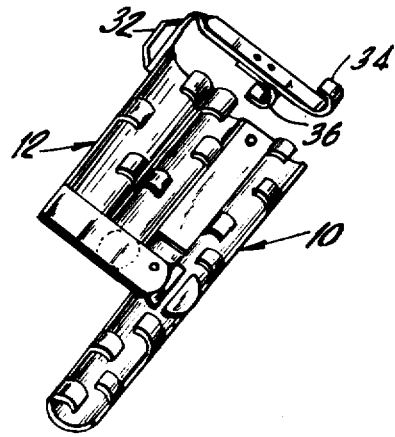
FIG. 5 is a perspective view illustrating an alternative position of one portion of the structure of the present invention.

While holding on with both hands to the length of rope that passes through the tube 12, the man may lower himself down the rope. At any time during his descent he may actuate the rope-gripping eccentric member 26 so as to clamp the rope and thus leave his hands free. It should be noted that at this time the eccentric member 26 may be made integral with the portion of the tube 12 that is hingedly mounted. Thus, by manipulating the handle 32, the man may control the speed of his descent or may stop it entirely by further actuation of the eccentric member. In this connection, it should also be noted that the hook members 34 and 36, when placed in the position shown in FIG. 5, retain the handle in the locked position by engaging the rope.

The present invention may be used for a descent that is greater than 75 feet but still using a rope that is only 150 feet long. The user lowers the entire rope down the drop and then inserts a smaller second length of rope through the tube 10. One end of the smaller rope is placed about the individual's body and the other end of the smaller rope is knotted above the tube 10. The knot serves the same function as the anchor T shown in FIG. 1. The longer rope is then inserted into the tube 12. The climber would then lower himself down the rope 12, using the eccentric member 26 as desired and as explained hereinabove.

The present invention may be used in still another manner. A first end of the rope is tied to the anchor T and this length of rope is then inserted into the tube 12. The climber would then tie the rope to his own body proximate the opposite or second end and insert the second end through the tube 10, as described hereinabove, utilizing a knot at the upper end of the tube 10. He could then lower himself down the full rope in the same manner as described hereinabove.

While the use of the present invention has been described in connection with an individual lowering himself down a rope, it should be evident that the same device may be used to climb up a rope. However, in this latter instance, it would be necessary for the individual to use his hands to pull himself up the rope and, if possible, use his feet as an assist in climbing the vertical incline. The individual would then have to free one hand in order to actuate the eccentric member 26.

While described as applied to a device for climbing a rope, the clamping device of this invention may be used in many other applications as for example in clamping of tent ropes, or any two ropes.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. A rope clamping device comprising:
  a. first and second elongated, substantially tubular members secured to each other such that their longitudinal axes are substantially parallel, the wall of said first and said second tubular members having a plurality of axially spaced apart slots formed therein, said slots being transverse to the longitudinal axes of said tubular members, said slots defining a plurality of axially spaced apart fingers that extend in a circumferential direction, each said finger having a free end that is angularly spaced apart from the remainder of its respective tube wall to thereby define openings in the wall of said tubular members, whereby any portion of the rope may be threaded thereon, the size of said openings in an angular direction and the axial spacing between adjacent ones of said fingers on each said tubular member being at least as great as the diameter of the rope, said second tubular member being formed in two coaxial, contiguous sections;
  b. hinge means for coupling said two sections of said second tubular member, the lower of said two sections being pivotable through an arc of approximately 180°;
  c. hook means secured to said pivotable lower section of said second tubular member for engaging the rope when said lower section is in the pivoted position;
  d. a rope-gripping member rigidly secured to said first tubular member intermediate the end thereof for preventing movement of said device relative to the rope, said rope-gripping member comprising two laterally spaced apart and oppositely facing D-shaped discs having straight and curved peripheral portions, each said disc having a groove in the curved peripheral portion thereof, the dimension of said grooves and the transverse dimension of the space between the straight peripheral portions of said discs being at least as great as the diameter of the rope; and
  e. a rope-engaging member journaled in said lower section of said second tubular member, the rope and said rope-engaging member being relatively movable with respect to each other, said rope-engaging member comprising an eccentric wheel, the maximum spacing between the periphery of the said wheel and the inside diameter of said second tubular member, being at least as great as the diameter of the rope, whereby said device follows the user during movement along the length of the rope, said rope-engaging member being selectively actuated for terminating the movement of the user.

* * * * *